United States Patent [19]
Hurd

[11] Patent Number: 5,577,437
[45] Date of Patent: Nov. 26, 1996

[54] COOKER DIE REMOVABLY SECURING MECHANISM

[75] Inventor: Ronald D. Hurd, Minnetonka, Minn.

[73] Assignee: General Mills, Inc., Minneapolis, Minn.

[21] Appl. No.: 554,059

[22] Filed: Nov. 6, 1995

[51] Int. Cl.$^6$ .................. A23L 1/00; A23P 1/00; F16L 19/00; F16L 23/036
[52] U.S. Cl. ............... 99/353; 99/450.7; 285/27; 285/360
[58] Field of Search ............ 99/353–355, 450.1–450.8, 99/342, 483, 348; 264/209.2; 285/27, 360–363, 913, 912; 366/290, 291, 83–86; 425/131.1, 378.1, 463, 133.1, 462; 426/233, 448, 449, 514–516

[56] References Cited

U.S. PATENT DOCUMENTS

| | | |
|---|---|---|
| 363,133 | 5/1887 | Gavit . |
| 3,084,810 | 4/1963 | Vogel . |
| 3,130,468 | 4/1964 | McFall . |
| 3,139,844 | 7/1964 | Landers . |
| 3,299,474 | 1/1967 | Ashworth, Jr. . |
| 3,345,854 | 10/1967 | Gross . |
| 3,354,686 | 11/1967 | Petsch . |
| 3,391,565 | 7/1968 | Linnerz et al. . |
| 3,543,557 | 12/1970 | Lomas . |
| 3,599,467 | 8/1971 | Valks . |
| 3,834,208 | 10/1974 | Schmidt . |
| 4,422,372 | 12/1983 | Hoezee .................. 99/353 |
| 4,615,894 | 10/1986 | Ruegg .................. 26/516 |
| 4,630,533 | 12/1986 | Schaaf et al. .......... 99/450.7 X |
| 4,722,357 | 2/1988 | Bormioli ................. 285/912 |
| 4,859,165 | 8/1989 | Hoashi ................... 425/133.1 |
| 4,875,847 | 10/1989 | Wenger et al. ......... 366/85 X |
| 4,960,043 | 10/1990 | Van Lengerich ......... 99/353 |
| 4,984,514 | 1/1991 | Van Lengerich ......... 99/348 X |
| 4,990,022 | 2/1991 | Watanabe et al. ....... 285/362 |
| 5,190,772 | 3/1993 | Conselvan et al. . |
| 5,333,538 | 8/1994 | Sawa ..................... 425/131.1 X |
| 5,403,603 | 4/1995 | McCullough et al. ..... 426/233 |
| 5,433,490 | 7/1995 | Hurd et al. . |
| 5,435,236 | 7/1995 | Weinstein et al. ......... 99/353 |

FOREIGN PATENT DOCUMENTS

| | | |
|---|---|---|
| 2601619 | 1/1988 | France . |
| 1452372 | 8/1973 | Germany . |
| 2457532 | 6/1976 | Germany . |
| 60-225728 | 11/1985 | Japan . |
| 587117 | 4/1977 | Switzerland . |
| 2070485 | 9/1981 | United Kingdom . |

OTHER PUBLICATIONS

Beringer Self–Lock Screen Changer for processing thermoplastics and other compounds. Beringer, Beringer Way, P.O. Box 485, Marblehead, Mass. 01945, Jan., 1993.
Beringer Ultra–Lock Slide Plate Screen Plate Changer, Beringer, Beringer Way, P.O. Box 485, Marblehead, Mass. 01945–9978, Sep., 1994.

Primary Examiner—Timothy F. Simone
Attorney, Agent, or Firm—John A. O'Toole; L. MeRoy Lillehaugen; Alan D. Kamrath

[57] ABSTRACT

A mechanism (10) is disclosed including a slide plate (32) having die openings (38) adapted to hold dies (42a, 42b) and slideably mounted between the axial downstream face of a barrel extension (20) and an annular pressure seal (56) and the axially upstream face of an annular pressure plate (48). The annular pressure seal (56) is axially adjustably mounted to a first mechanism frame element (18) and the annular pressure plate (48) is mounted to a second mechanism frame element (46). The framework (68) of a cutter assembly (66) is mounted by a hinge (70) to the second mechanism frame element (46) and is carried thereby. The central openings (52, 54) of the annular pressure plate (48) and the second mechanism frame element (46) are frustoconical in shape having circular cross sections to allow exit of food extrudates from the dies (42a, 42b) without hang-up and providing maximum clearance and visibility of the rotary cutter (74) of the cutter assembly (66). The slide plate (32) is slid by a hydraulic cylinder (44) in a linear path to move one of the dies (42a, 42b) from axial alignment with the pressure seal (56) and pressure plate (48) to the other of the dies (42a, 42b) being in axial alignment with the pressure seal (56) and pressure plate (48) without idling the cooker/extruder (12).

20 Claims, 2 Drawing Sheets

COOKER DIE REMOVABLY SECURING MECHANISM

BACKGROUND

The present invention generally relates to mechanisms for removably securing a die to the discharge of a cooker and particularly relates to mechanisms for allowing the quick and easy change of a die to the discharge of a cooker.

During the normal operation of a cooker/extruder, it becomes necessary and/or desirable to change the die from which the extrudate passes from the cooker. For example, the die often becomes plugged, requiring it to be replaced with a clean one. Dies for forming complexly shaped products are especially prone to plugging and other die complications. Similarly, the die may be replaced with a die extruding extrudates of a differing configuration and/or size. Conventionally, dies were secured to cookers by a plurality of fasteners which were required to be removed and replaced each time the die was desired to be replaced. In addition to being very time consuming, removal and replacement of such fasteners typically required several personnel including mechanics. Further, in addition to personnel costs, the time required to replace the die takes the cooker out of production and loses the steady state conditions for the cooker, with the amount of recovery time to steady state conditions being directly dependent on the time that the cooker is down.

U.S. Pat. No. 5,433,490 issued Jul. 18, 1995 discloses a cooker die removably securing mechanism representing a major advance in significantly reducing the time and personnel required to replace the die. However, the mechanism of the '490 Patent did require taking the cooker out of production while the die was being changed.

Thus, a need exists for a mechanism that allows for the removable securement of the die to the cooker which does not require the removal and replacement of a plurality of fasteners and which reduces the personnel required to replace the die and which does not require the cooker to be taken out of production.

It is thus an object of the present invention to provide a novel mechanism for removably securing a die to a cooker.

It is further an object of the present invention to provide such a novel cooker die removably securing mechanism which does not require fasteners between the flange of the cooker and the die.

It is further an object of the present invention to provide such a novel cooker die removably securing mechanism which does not require the cooker to be taken out of production to replace the die.

It is further an object of the present invention to provide such a novel cooker die removably securing mechanism which reduces the personnel required to replace the die.

It is further an object of the present invention to provide such a novel cooker die removably securing mechanism resulting in improved product quality due to more frequent die changes.

It is further an object of the present invention to provide such a novel cooker die removably securing mechanism resulting in quicker system start-ups such as following down weekends.

It is further an object of the present invention to provide such a novel cooker die removably securing mechanism resulting in increased productivity.

It is further an object of the present invention to provide such a novel cooker die removably securing mechanism having reduced ingredient losses.

SUMMARY

Surprisingly, the above objects and other aims can be satisfied in the field of securing dies to cookers by providing, in the preferred form, a slide plate including first and second die openings and slideable between an annular pressure seal and an annular pressure plate between a first position with the first die opening aligned therewith and a second position with the second die opening aligned therewith, with the central opening of the annular pressure plate being of a size at the upstream face abutting with the slide plate generally equal to the die openings and being of an increasing size with increased axial spacing from the slide plate to allow exit of food extrudate from the die without hang-up.

In preferred aspects of the present invention, a cutter assembly is mounted to the mechanism frame element holding the annular pressure plate for carrying thereby, with the cutter assembly including a rotary cutter rotatably mounted by the framework of the cutter assembly for engagement with the die aligned with the annular pressure seal and the annular pressure plate.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
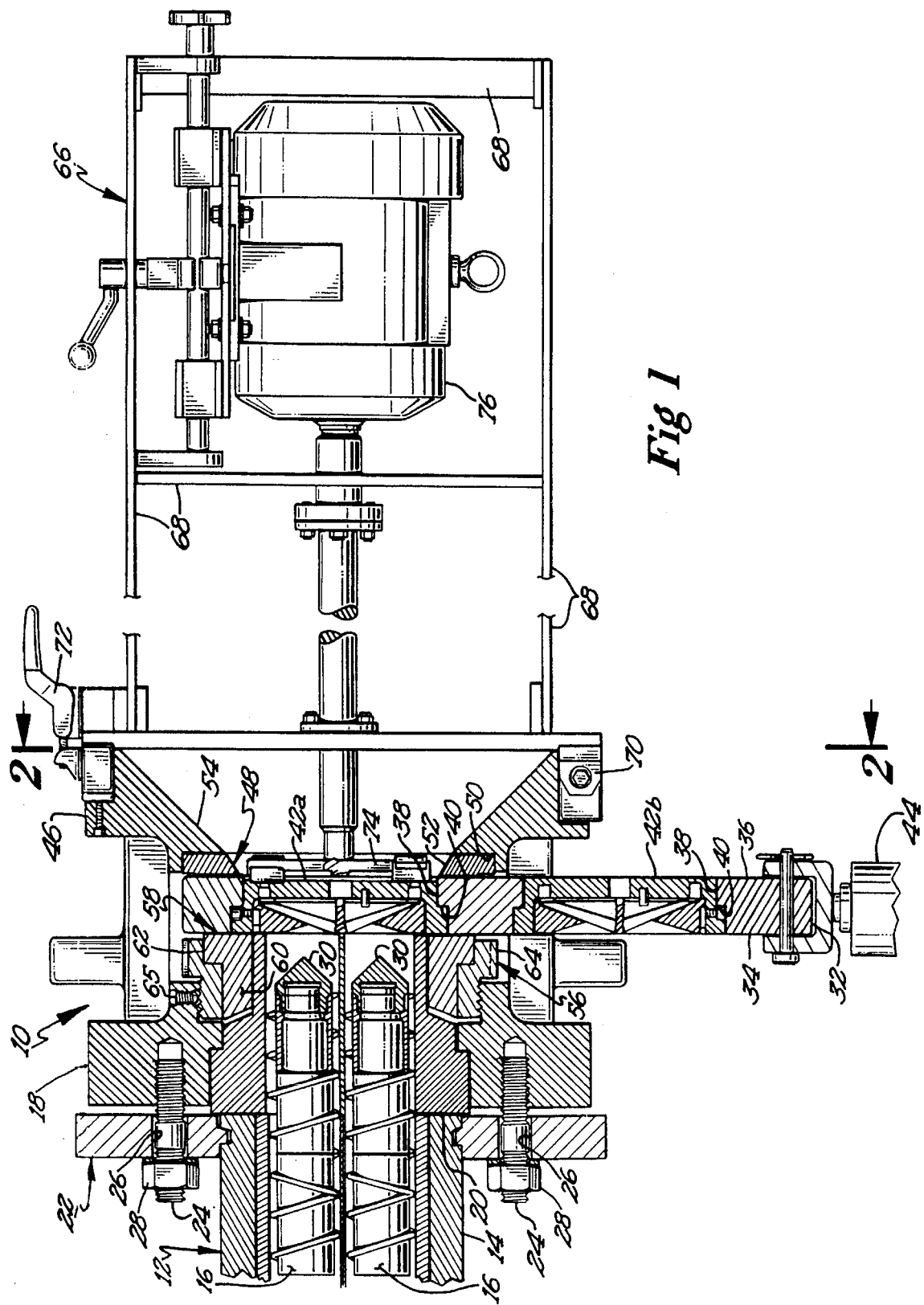
FIG. 1 shows a cross-sectional view of a mechanism for removably securing a die to a cooker/extruder according to the preferred teachings of the present invention, with portions broken away to show constructional details.
Figure 2:
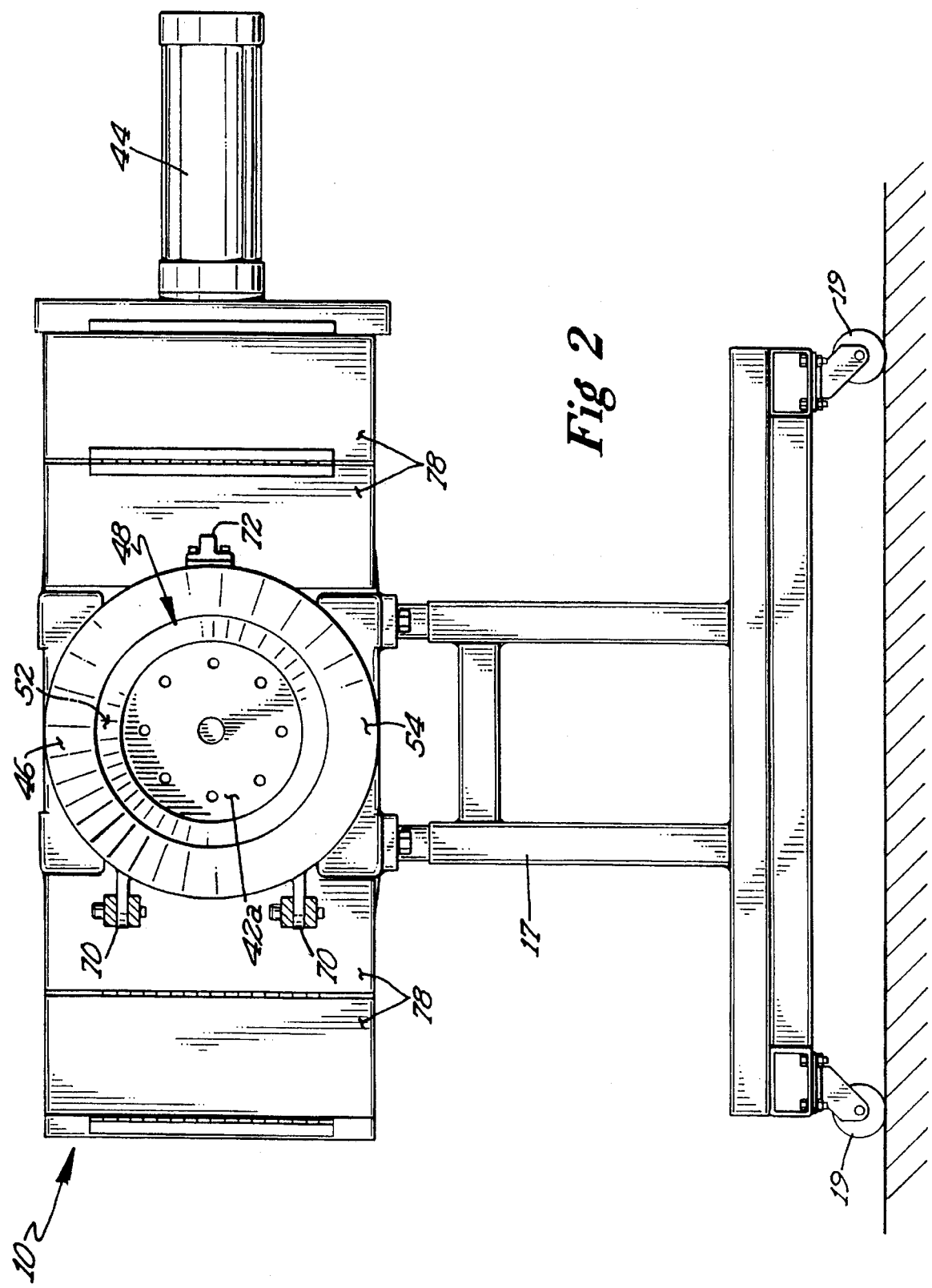
FIG. 2 shows a partial, cross-sectional view of the cooker die removably securing mechanism of FIG. 1 according to section lines 2—2 of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "front", "back", "height", "width", "length", "end", "side", "horizontal", "vertical", "axial", "radial", and similar terms are used herein, it should be understood that these terms have reference only to the structure shown in the drawings as it would appear to a person viewing the drawings and are utilized only to facilitate describing the invention.

DESCRIPTION

Mechanism for removably securing a die to a continuous cooker/extruder for allowing the quick and easy removal and/or installation of the die to the cooker/extruder according to the preferred teachings of the present invention is shown in the drawings and generally designated 10. Particularly, mechanism 10 of the most preferred form is shown utilized on a continuous cooker/extruder 12 including a barrel 14 including twin cylindrical discharges in which augers or screw elements 16 are rotatably received.

Mechanism 10 generally includes a carrier frame 17 having suitable transport wheels or casters 19. Mechanism 10 includes a bushing or barrel extension 20 having a shape and size complementary to barrel 14. Barrel extension 20 is secured downstream of barrel 14 such as by a shoulder on a mechansim frame element 18 of the mechanism frame which abuts with a shoulder formed on barrel extension 20. Mechanism frame element 18 is secured to barrel 14 by any suitable means. In the most preferred form, a split clamp 22 is secured to barrel 14 and axially extending studs 24 are threaded into mechanism frame element 18 and extend through bores 26 formed in clamp 22, with nuts 28 threaded on studs 24 on the opposite side of clamp 22 than mechanism frame element 18. However, it can be appreciated that mechanism frame element 18 can be mounted to cooker/extruder 12 in a variety of manners depending upon the particular cooker/extruder 12. In the form shown, suitable screw elements 30 are secured to screw elements 16 and extend axially into barrel extension 20. In the most preferred form, barrel 14 and extension 20 and screw elements 16 and 30 are arranged horizontally with screw elements 16 and 30 being arranged in the same horizontal plane.

Mechanism 10 further includes a horizontal slide plate 32 including spaced, planar, parallel, upstream and downstream surfaces 34 and 36 extending generally perpendicular to the axis of screw elements 16 and 30 and to barrel 14 and extension 20. Upstream surface 34 abuts against and slides on the free end of barrel extension 20. Slide plate 32 includes first and second die openings 38 extending from upstream surface 34 to downstream surface 36 and having parallel axes arranged in the same horizontal plane. In the preferred form, openings 38 have a larger size at upstream surface 34 than at downstream surface 36 and in the most preferred form are stepped to form a radially extending shoulder 40. First and second dies 42a and 42b of a standard design are slideably received in openings 38 generally with a friction fit. Dies 42a and 42b have upstream and downstream surfaces which are generally coextensive with upstream and downstream surfaces 34 and 36 when dies 42a and 42b are received in openings 38.

Mechanism 10 further includes a suitable mechanism 44 such as a hydraulic cylinder shown for sliding slide plate 32 relative to extension 20 and specifically to align one or the other of dies 42a and 42b with extension 20. Hydraulic cylinder 44 is secured between the frame and slide plate 32 and strokes slide plate 32 in a straight linear path in the preferred form.

A second mechanism frame element 46 is held in a fixed position relative to mechanism frame element 18 by any suitable means such as being integrally formed in a single component and is located on the opposite side of slide plate 32 than mechanism frame element 18. An annular slide pressure plate 48 is held in an annular recess 50 formed in mechanism frame element 48 for slideably abutting its upstream face with downstream surface 36 of slide plate 32. Pressure plate 48 includes a frustoconical-shaped central opening 52 having circular cross sections and of an increasing size extending axially from barrel extension 20 and slide plate 32. The size of opening 52 at the upstream face of pressure plate 48 abutting with downstream surface 34 is generally equal to die openings 38 at downstream surface 34. In the most preferred form, mechanism frame element 46 also includes a frustoconical-shaped central opening 54 having circular cross sections and of a size equal to opening 52 at the abutment with pressure plate 48 and of an increasing size extending axially from pressure plate 48 and slide plate 32. In the most preferred form, the outward angle of opening 54 is greater than for opening 52.

Mechanism 10 further includes an annular pressure seal 56 including an annular sleeve 58 including a cylindrical portion 60 extending parallel to and slideable upon barrel extension 20 and a radially extending flange portion 62. The inner diameter of seal 56 defined by the opening of sleeve 58 is of a size less than die openings 38 at surface 34. The downstream face of flange portion 62 slideably abuts with upstream surface 34 of slide plate 32 and with the portions of die 42a or 42b located outside of the opening of sleeve 58. A locking collar 64 having Z-shaped cross sections slideably receives sleeve 58, with collar 64 abutting with flange portion 62 for preventing axial movement therebeyond. Collar 64 is threadably mounted in frame element 18 and fixed relative thereto such as by set screws 65. Thus, pressure seal 56 is axially adjustable relative to mechanism frame element 18.

It should then be appreciated that slide plate 32 is axially captured between flange portion 62 of sleeve 58 and pressure plate 48, but is also horizontally slideable therebetween. The amount of pressure placed on slide plate 32 between portion 62 and plate 48 can be adjusted by axially sliding locking collar 64 relative to mechanism frame element 18. It should also be appreciated that food leaving barrel extension 20 and entering die 42a or 42b is under pressure, with pressure seal 56 generally preventing leakage of the extrudable food from between the axial end of barrel extension 20, upstream surface 34, and the upstream surface of die 42a or 42b. On the other hand, food exiting die 42a or 42b is generally exiting to atmospheric pressure such that food will not have a tendency to travel between downstream surface 36 and pressure plate 48. Thus, pressure plate 48 acts as a thrust bearing surface and is not required to be of a sealing variety.

According to the most preferred form of the present invention, mechanism 10 further includes a cutter assembly 66. Cutter assembly 66 generally includes a framework or cutter frame 68 mounted to mechanism frame element 46. In the most preferred form, cutter frame 68 includes a hinge 70 for pivotally mounting one of the frame vertical edges about a vertical axis to mechanism frame element 46. A suitable clasp 72 is provided to removably hold the other frame vertical edge to mechanism frame element 46. Cutter assembly 66 further includes a rotary cutter 74 rotatably mounted by cutter frame 68 about a horizontal axis. Rotary cutter 74 is of a diameter generally equal to die 42a or 42b and less than opening 52. Rotary cutter 74 includes a plurality of radially extending knives which abut and slide on the downstream face of die 42a or 42b and cut the food exiting die 42a or 42b into axial lengths. Rotary cutter 74 is rotated by suitable means such as an electric motor 76 shown. Rotary cutter 74 is axially movable such as by slideably mounting motor 76 as shown to be spaced from die 42a or 42b when slide plate 32 is being slid by hydraulic cylinder 44.

It should be appreciated that suitable shields such as a cabinet including access doors 78 can be provided to prevent access to slide plate 32 when it is being slid by hydraulic cylinder 44 but still allow access to allow removal and replacement of die 42a or 42b from openings 38 which is not in axial alignment with plate 48 and seal 56. Suitable electrical interlocks can be provided to prevent operation of hydraulic cylinder 44 when access doors 78 are open for safety reasons.

Now that the basic construction of mechanism 10 according to the preferred teachings of the present invention has been set forth, the operation and major advantages of mechanism 10 can be explained. For the sake of explanation, it will be assumed that slide plate 32 is in the position shown in FIG. 1 with die 42a axially aligned with barrel extension 20. In operation, food from cooker/extruder 12 is moved under pressure due to the rotation of screw elements 16 and 30 through barrel 14 and extension 20 towards and through die 42a, with the food extrudates passing from die 42a being cut to axial lengths due to the rotation of rotary cutter 74. In the event that it is desired to change die 42a such as in the event that die 42a becomes partially blocked, that it is desired to form different shaped extrudates, or the like, and assuming that die 42b is in position in slide plate 32, hydraulic cylinder 44 can be actuated to stroke slide plate 32 relative to barrel extension 20 in a straight linear path in the most preferred form to move die 42a to be positioned out of axial alignment with barrel extension 20 and move die 42b to be positioned in axial alignment with barrel extension 20. It should be noted that sliding of slide plate 32 can be performed with continued operation of cooker/extruder 12, with cylinder 44 moving slide plate 32 with sufficient pressure to overcome any sliding friction created by food pushing against die 42a and with sufficient speed such that switching one of the dies 42a or 42b axially positioned in line with barrel extension 20 with the other of the dies 42a or 42b is only momentary. Thus, excessive food pressure will not be created by food pushing against slide plate 32 intermediate openings 38 during changing of dies 42a and 42b which in the preferred form takes approximately 1½ seconds.

To prevent the knives of rotary cutter 74 from catching, rotary cutter 74 (while rotating) can be axially moved away from slide plate 32 just before slide plate 32 is moved by hydraulic cylinder 44 and moved toward slide plate 32 to again abut die 42a or 42b axially in alignment with barrel extension 20 after slide plate 32 is moved. When rotary cutter 74 is so axially spaced, extrudate from die 42a or 42b will not be uniformly cut and will have excessive length and can be disposed of in any desired manner.

It should then be appreciated that with die 42b in axial alignment with barrel extension 20, die 42a can be removed from opening 38 of slide plate 32 and can be unplugged or otherwise serviced or can be replaced with a die of a differing configuration. In the event that it is desired to change die 42b, hydraulic cylinder 44 can be actuated to stroke slide plate 32 in the opposite direction to again position die 42b out of axial alignment with barrel extension 20 and position die 42a in axial alignment with barrel extension 20.

In the event that it is desired to service die 42a or 42b in axial alignment with barrel extension 20 or to service rotary cutter 74, clasp 72 can be released and cutter frame 68 pivoted about hinge 70 to provide access. Thus, it is not necessary to remove cutter assembly 66 from mechanism frame element 46. Due to the portability of mechanism 10 due to its mounting on transport wheels 19 in the most preferred form, the mounting of cutter assembly 66 to mechanism frame element 46 allows movement as a unit from one cooker/extruder 12 to another in an emergency and makes it simple for storage, if necessary. It should be appreciated that the mechanism frame including mechanism frame elements 18 and 46 are suitably secured to carrier frame 17. Further, cutter assembly 66 does not have to be removed when changing screw elements 16 and 30 as was typically required prior to use of mechanism 10 of the present invention. It can also be appreciated that the frustoconical shapes of openings 52 and 54 are advantageous in providing maximum clearance and visibility of rotary cutter 74 and in allowing exit of the axially cut food extrudate without hanging up on ledges or the like.

Prior to the present invention, when die 42a became plugged, it was often necessary to remove multiple fasteners which attached die 42a to cooker/extruder 12 to change the plugged die 42a with a clean die 42b. The head including the plugged die 42a was then replaced with a spare head including the clean die 42b. Then, each of the fasteners were replaced. This change typically took about 45 minutes to accomplish. Using mechanism 10 according to the preferred teachings of the present invention, changing a plugged die 42a with a clean die 42b only takes about ten to fifteen seconds, with this change being accomplished by simply actuating cylinder 44 and specifically without requiring removal and replacement of fasteners between cooker/extruder 12 and die 42a or 42b. Thus, there is a direct production gain of about 45 minutes multiplied by the extrudate production rate per minute for cooker/extruder 12 utilizing mechanism 10 according to the teachings of the present invention.

In addition to this directly observable reduction in the amount of time required to change dies 42a and 42b, there are numerous indirect benefits. For example, prior to the present invention, the operator of cooker/extruder 12 could not personally change die 42a. Rather, one or more maintenance workers had to be found to substitute die 42a. Unfortunately, maintenance workers may not be readily available when the need for the clean die 42b occurs. Thus, the operator was faced with a choice between two undesirable alternatives. First, the operator could continue to make off-specification product. In the alternative, the operator could shut down cooker/extruder 12 until maintenance workers could be found to substitute die 42a. Using mechanism 10 according to the preferred teachings of the present invention, die 42b can be substituted by the operator personally. Thus, the time looking for maintenance workers is also recovered. This is also a significant advantage when numerous cooker/ extruders 12 are desired to be started simultaneously such as following down weekends.

Another indirect advantage is an increase in product quality. Due to the time requirements and inconvenience of changing dies 42a prior to the present invention, changeovers of dies 42a do not occur as often as they should. As a result, cooker/extruders 12 having dies 42a which are partially plugged are continued to be operated, forming inferior product, until the plugging becomes more severe. Additionally, the come-up time to steady state conditions for cooker/extruders 12 can be considerable, on the order of ½ to 1 hour. If cooker/extruder 12 is shut down for more than a few minutes (such as for substituting die 42a prior to the present invention and/or finding maintenance workers to perform the substitution), cooker/extruder 12 can loose its steady state conditions. Specifically, the material being held in cooker/extruder 12 experiences an overcook and subsequent increase in viscosity. In order to get this overcooked product out of cooker/extruder 12, additional water must be added. When cooker/extruder 12 is restarted, an initial 35 to 45 minutes of production is lost as off-specification product in cooker/extruder 12 is produced/extruded to allow cooker/extruder 12 to come up to steady state conditions. As mechanism 10 according to the preferred teachings of the present invention allows die 42a to be changed without shutting down cooker/extruder 12, loss of steady state conditions does not occur and the recovery time of cooker/extruder 12 is reduced from approximately one hour to nothing. Typically, dies 42a and 42b require changing every 8½ to 12 hours. Thus, the total production time of cooker/extruder 12 producing specification product can be increased by at least 1½ to 2 hours resulting in increased production when die 42a is replaced utilizing mechanism 10 according to the preferred teachings of the present invention over typical prior die replacement techniques.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. Mechanism for removably securing a die to a food cooker/extruder comprising, in combination: a slide plate having an upstream surface, a downstream surface and at least first and second die openings for receiving dies extending from the upstream surface to the downstream surface; a mechanism frame including a first mechanism frame element and a second mechanism frame element; means for securing the first mechanism frame element to the food cooker/extruder; an annular pressure seal having a downstream face and an inner diameter of a size less than the first and second die openings at the upstream surface of the slide plate, with the annular pressure seal held by the first mechanism frame element with the downstream face slideably abutting with the upstream surface of the slide plate and providing a seal generally preventing leakage of food from the die aligned with the inner diameter of the annular pressure seal; an annular pressure plate having an upstream face and a central opening of a size at the upstream face generally equal to the first and second die openings at the downstream surface of the slide plate and increasing with axial spacing from the downstream face of the annular pressure plate, with the annular pressure plate held by the second mechanism frame element with the upstream face slideably abutting with the downstream surface of the slide plate; and means for sliding the slide plate between a first position wherein the first die opening is aligned with the annular pressure seal and annular pressure plate and a second position wherein the second die opening is aligned with the annular pressure seal and annular pressure plate, with the increasing size of the central opening allowing exit of food extrudate from the die without hang-up.

2. The mechanism of claim 1 wherein the second mechanism frame element includes a central opening of a size at the abutment with the annular pressure plate generally equal to the size of the central opening of the annular pressure plate and increasing with axial spacing from the upstream face of the annular pressure plate.

3. The mechanism of claim 2 wherein the die openings have a larger size at the upstream surface of the slide plate than at the downstream surface of the slide plate.

4. The mechanism of claim 2 wherein the annular pressure seal is axially adjustable relative to the first mechanism frame element.

5. The mechanism of claim 2 further comprising, in combination: a cutter assembly including a framework; a rotary cutter rotatably mounted by the framework for engagement with the die aligned with the annular pressure seal and annular pressure plate; and means for mounting the framework to the mechanism frame for being carried thereby.

6. The mechanism of claim 5 wherein the rotary cutter is axially slideable in the framework to be spaced from the die when the sliding plate is being slid by the sliding means.

7. The mechanism of claim 6 wherein the mounting means comprises a hinge between the framework and the mechanism frame for pivotally mounting the framework to the mechanism frame.

8. The mechanism of claim 2 wherein the central openings of the annular pressure plate and of the second frame element are frustoconical shaped.

9. The mechanism of claim 8 wherein the central openings have circular cross sections.

10. The mechanism of claim 2 further comprising, in combination: a barrel extension adapted to extend between the cooker/extruder and the slide plate, with the annular pressure seal located on the barrel extension.

11. The mechanism of claim 10 further comprising, in combination: at least a first screw element rotatable within the barrel extension and adapted to be interconnected to a screw element of the cooker/extruder.

12. The mechanism of claim 1 wherein the sliding means comprises a hydraulic cylinder secured between the mechanism frame and the slide plate.

13. The mechanism of claim 12 wherein the sliding means comprises means for stroking the slide plate in a straight linear path between the first and second positions.

14. The mechanism of claim 1 wherein the central opening of the annular pressure plate is frustoconical shaped.

15. The mechanism of claim 1 wherein the central opening of the annular pressure plate has circular cross sections.

16. Mechanism for removably securing a die to a food cooker/extruder comprising, in combination: a slide plate having an upstream surface, a downstream surface and at least first and second die openings for receiving dies extending from the upstream surface to the downstream surface; a mechanism frame including a first mechanism frame element and a second mechanism frame element; means for securing the first mechanism frame element to the food cooker/extruder, with the slide plate being slideably mounted between the first and second mechanism frame elements; means for sliding the slide plate between a first position wherein the first die opening is adapted to be aligned with the cooker/extruder and a second position wherein the second die opening is adapted to be aligned with the cooker/extruder; and a cutter assembly including a framework, a rotary cutter rotatably mounted by the framework for engagement with the die received in the die opening adapted to be aligned with the cooker/extruder, and means for mounting the framework to the second mechanism frame element for being carried thereby, with the second mechanism frame element having a central opening of an increasing size with axial spacing from the slide plate to maximize clearance and visibility of the rotary cutter engaging the die.

17. The mechanism of claim 16 wherein the rotary cutter is axially slideable in the framework to be spaced from the die when the sliding plate is being slid by the sliding means.

18. The mechanism of claim 17 wherein the mounting means comprises a hinge between the framework and the second mechanism frame element for pivotally mounting the framework to the second mechanism frame element.

19. The mechanism of claim 17 wherein the central opening is frustoconical shaped.

20. The mechanism of claim 19 wherein the central opening has circular cross sections.

* * * * *